S. M. FILL.
FASTENER.
APPLICATION FILED JULY 9, 1912.
1,071,902.
Patented Sept. 2, 1913.
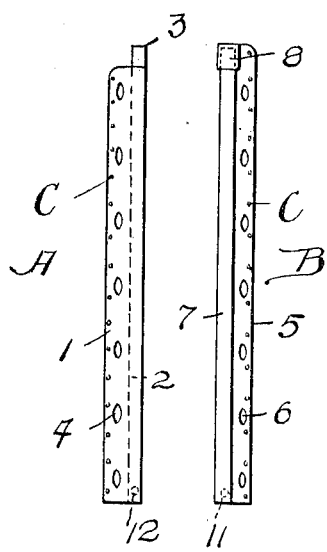
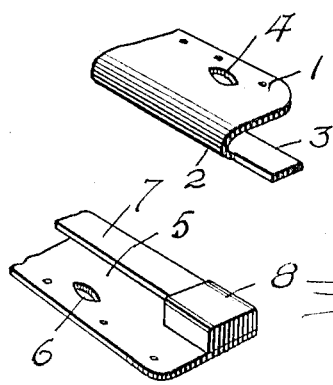
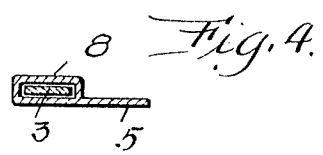
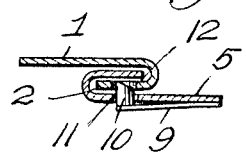
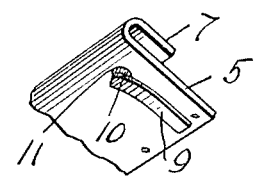
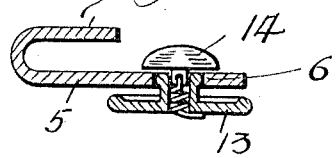
WITNESSES
Samuel Payne
J. Stanley Burch
INVENTOR
S. M. Fill

UNITED STATES PATENT OFFICE.

STANLEY M. FILL, OF FAIRMONT, WEST VIRGINIA.

FASTENER.

1,071,902.     Specification of Letters Patent.     Patented Sept. 2, 1913.

Application filed July 9, 1912. Serial No. 708,448.

*To all whom it may concern:*

Be it known that I, STANLEY M. FILL, a citizen of the United States of America, residing at Fairmont, in the county of Marion and State of West Virginia, have invented certain new and useful Improvements in Fasteners, of which the following is a specification, reference being had therein to the accompanying drawing.

This invention relates to fasteners, and the primary object of my invention is to provide fasteners that can be detachably connected to garments or pieces of washable fabric, whereby the fasteners can be removed when the garments or pieces of fabric are washed or cleaned.

Another object of this invention is to provide a simple and durable fastener that can be advantageously used in connection with ladies' gowns, blouses, waists and covers, the construction of the fastener being such that the same can be manipulated by the wearer without assistance.

A further object of this invention is to provide strip fasteners that are simple in construction, durable, inexpensive to manufacture, applicable for various purposes and highly efficient for the purposes for which they are intended.

With the above and other objects in view, the invention resides in a novel construction, to be hereinafter specifically described and then claimed, and reference will now be had to the drawing, wherein:—

Figure 1 is a front elevation of the parts of the fastener. Fig. 2 is an enlarged perspective view of one end of a part of the fastener. Fig. 3 is a perspective view of an end of another part of the fastener. Fig. 4 is an enlarged cross sectional view of the parts of the fastener in a closed position. Fig. 5 is an enlarged cross sectional view of the parts of the fastener in a closed position, showing a central section of the fastener. Fig. 6 is a similar view illustrating a locking device forming part of the fastener. Fig. 7 is a perspective view of a part of the fastener showing the locking device, and Fig. 8 is an enlarged cross sectional view of a part of the fastener, illustrating a manner of detachably connecting the same to a garment.

The fastener in accordance with this invention embodies two parts or sections, one of which is generally designated A and the other B.

The part A comprises a metallic strip 1 that has one of the longitudinal edges thereof bent to provide a longitudinal hook shaped edge or flange 2, said flange being in parallelism with the body of the strip 1. The flange 2 at one end thereof protrudes beyond the strip 1 and terminates in a tongue 3. The strip 1 is provided with equally spaced oval openings 4, the purpose of which will presently appear.

The part B of the fastener comprises a strip 5 having openings 6 similar to the strip 1. A longitudinal edge of the strip 5 has a flange 7 bent and shaped similar to the flange 2 of the strip 1, whereby said flanges can be interlocked, as shown in Fig. 5. One end of the strip 5 and the flange 7 thereof terminate in a rectangular socket 8 in which is placed the tongue 3 of the part A. The opposite end of the strip 5 is provided with a hold fast device for locking the ends of the parts A and B together, the said locking device comprising a resilient arm 9 that is soldered or otherwise secured to the strip 5. The free end of the arm 9 has a beveled tooth 10 that extends through an opening 11 provided therefor in the strip 5 into an opening 12 provided therefor in the flange 2 of the strip 1.

The fastener members A and B can be connected to a piece of fabric or garment by buttons 13 having spring held rotatable heads 14 that are placed through the openings 4 and 6 of said members and turned cross-wise of the strip 5 to hold the buttons in engagement therewith.

The fastener members A and B are provided with small openings C to permit of said members being secured to the fabric or garment by stitching or by small tacks. This arrangement can be used in lieu of employing the buttons 13.

The shank of the button 13 passes through the fabric or garment and it is through the medium of these buttons that the fastener members are detachably connected to a garment, thus permitting of said members being removed when the garment is to be washed or cleaned.

A fastener in accordance with this invention possesses the following advantages: When the ends of the strips 1 and 5 are connected together the fastener cannot become accidentally undone; the fastener is practically invisible and its construction permits of the members thereof being connected together without assistance; the fastener can be made of celluloid or other flexible material and besides being used in connection with garments, it can be employed in connection with corsets, etc.

It is thought that the utility of the fastener will be apparent without further description, and while in the drawing there is illustrated a preferred embodiment of my invention, it is to be understood that the structural elements are susceptible to such variations and modifications as fall within the scope of the appended claim.

What I claim is:—

A fastener for the purpose set forth comprising flexible strips adapted to be secured to a garment and each including a body portion and a longitudinal flange, said flanges adapted to interlock with each other for connecting the strips together, the flange of one of said strips extended at one end to provide a longitudinally projecting tongue, said flange at its other end provided with an opening, means integral with one end of the body portion of the other of said strips to provide in connection therewith a socket for the reception of said tongue when the flanges are interlocked, and means carried by the body portion of the last mentioned strip, extending through said body portion and engaging with said opening to prevent longitudinal movement of said apertured flange when the tongue of the flange is mounted in said socket.

In testimony whereof I affix my signature in the presence of two witnesses.

STANLEY M. FILL.

Witnesses:
C. H. SNIDER,
WINNIFUDE S. MURPHY.

---

Copies of this patent may be obtained for five cents each, by addressing the "Commissioner of Patents, Washington, D. C."